United States Patent
Kim (10) Patent No.: US 7,450,962 B2
(45) Date of Patent: Nov. 11, 2008

(54) METHOD FOR RELIABLY MANAGING DATABASE IN GSM/GPRS HYBRID TERMINAL AND HYBRID TERMINAL

(75) Inventor: Chul-Woo Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 373 days.

(21) Appl. No.: 11/230,966

(22) Filed: Sep. 20, 2005

(65) Prior Publication Data

US 2006/0105807 A1 May 18, 2006

(30) Foreign Application Priority Data

Oct. 25, 2004 (KR) ...................... 10-2004-0085232

(51) Int. Cl.
*H04M 1/00* (2006.01)

(52) U.S. Cl. .................... 455/556.1; 455/344; 455/407; 455/558

(58) Field of Classification Search ............... 455/566.1
See application file for complete search history.

(56) References Cited

U.S. PATENT DOCUMENTS

| | | | |
|---|---|---|---|
| 6,434,403 B1 | 8/2002 | Ausems et al. | |
| 6,549,773 B1 * | 4/2003 | Linden et al. | 455/426.1 |
| 6,549,917 B1 * | 4/2003 | Pollard et al. | 707/201 |
| 6,609,090 B1 * | 8/2003 | Hickman et al. | 704/9 |
| 6,611,849 B1 * | 8/2003 | Raff et al. | 707/203 |
| 6,804,338 B1 * | 10/2004 | Chen | 379/142.08 |
| 6,968,209 B1 * | 11/2005 | Ahlgren et al. | 455/558 |
| 7,054,594 B2 * | 5/2006 | Bloch et al. | 455/41.2 |
| 7,146,161 B2 * | 12/2006 | Chou | 455/418 |
| 7,216,231 B2 * | 5/2007 | Gehrmann | 713/171 |
| 2001/0002926 A1 | 6/2001 | Moon | |
| 2001/0016853 A1 * | 8/2001 | Kucala | 707/204 |
| 2001/0034728 A1 * | 10/2001 | McBride et al. | 707/1 |
| 2001/0044321 A1 * | 11/2001 | Ausems et al. | 455/556 |
| 2002/0120696 A1 * | 8/2002 | Mousseau et al. | 709/206 |
| 2003/0037020 A1 * | 2/2003 | Novak et al. | 707/1 |
| 2003/0078036 A1 * | 4/2003 | Chang et al. | 455/419 |
| 2003/0079124 A1 * | 4/2003 | Serebrennikov | 713/156 |
| 2003/0224754 A1 * | 12/2003 | Herzog | 455/406 |
| 2004/0116155 A1 * | 6/2004 | Aisenberg | 455/558 |
| 2004/0172369 A1 * | 9/2004 | Persson | 705/67 |
| 2004/0219949 A1 * | 11/2004 | Su et al. | 455/558 |
| 2004/0235523 A1 * | 11/2004 | Schrire et al. | 455/558 |
| 2004/0253975 A1 * | 12/2004 | Shiraogawa et al. | 455/550.1 |
| 2005/0048998 A1 * | 3/2005 | Zhu | 455/550.1 |
| 2005/0113088 A1 * | 5/2005 | Zinn et al. | 455/435.2 |
| 2005/0137983 A1 * | 6/2005 | Bells | 705/51 |
| 2005/0165869 A1 * | 7/2005 | Huang et al. | 707/204 |

(Continued)

*Primary Examiner*—Matthew Anderson
*Assistant Examiner*—Hai V Nguyen
(74) *Attorney, Agent, or Firm*—The Farrell Law Firm, PC (57) ABSTRACT

Disclosed is a hybrid terminal, which includes a mobile terminal unit for a Global System for Mobile communication (GSM) or a General Packet Radio Service (GPRS), a PDA (Personal Digital Assistant) unit combined with the mobile terminal unit, and a mirror database being connected between the mobile terminal and the PDA, for providing a memory space required for operations of the mobile terminal and the PDA, wherein the PDA includes a database for storing PDA data, reads the PDA data, and stores the read PDA data in the mirror database, wherein the mobile terminal includes a Subscriber Identity Module (SIM) card for storing SIM data, reads the SIM data, and stores the read SIM data in the mirror database.

12 Claims, 8 Drawing Sheets

U.S. PATENT DOCUMENTS

| | | |
|---|---|---|
| 2006/0041726 A1* | 2/2006 | Steubing .................... 711/162 |
| 2006/0085527 A1* | 4/2006 | Phillips et al. .............. 709/221 |
| 2006/0129828 A1* | 6/2006 | Shi ........................... 713/182 |
| 2006/0235909 A1* | 10/2006 | Oks et al. ................... 707/204 |
| 2006/0240806 A1* | 10/2006 | Demirbasa et al. ....... 455/412.1 |
| 2006/0272034 A1* | 11/2006 | Bhansali et al. .............. 726/34 |
| 2006/0276226 A1* | 12/2006 | Jiang ........................ 455/558 |
| 2007/0116248 A1* | 5/2007 | Samama ................. 379/355.04 |
| 2007/0177562 A1* | 8/2007 | Castrogiovanni et al. .... 370/338 |
| 2007/0192785 A1* | 8/2007 | Pellinat et al. ................. 725/24 |
| 2007/0204104 A1* | 8/2007 | Wan et al. .................... 711/114 |
| 2007/0226278 A1* | 9/2007 | Yu et al. ..................... 707/204 |
| 2007/0232272 A1* | 10/2007 | Gonsalves et al. ........ 455/412.1 |
| 2008/0014869 A1* | 1/2008 | Demirbasa et al. ......... 455/41.2 |

* cited by examiner

METHOD FOR RELIABLY MANAGING DATABASE IN GSM/GPRS HYBRID TERMINAL AND HYBRID TERMINAL

PRIORITY

This application claims priority to an application entitled "Method For Reliably Managing Database In GSM/GPRS Hybrid Terminal And Hybrid Terminal" filed in the Korean Intellectual Property Office on Oct. 25, 2004 and assigned Serial No. 2004-85232, the contents of which are incorporated herein by reference.

BACKGROUND OF THE INVENTION

1. Field of the Invention

The present invention relates to a hybrid terminal for a Global System for Mobile communication (GSM) or a General Packet Radio Service (GPRS), and more particularly to method for managing a database in a GSM/GPRS hybrid terminal.

2. Description of the Related Art

A GSM/GPRS system is a digital mobile telephone system widely used in Europe and other regions. In the general GSM/GPRS system, a GSM Mobile Equipment (ME) means a combination of a GSM/GPRS Mobile Terminal (MT) with a Subscriber Identity Module (SIM) card. A SIM card stores information relating to a subscriber identity such as an International Mobile Subscriber Identity (IMSI). Further, a SIM card stores contents of a phone book or SMS of a GSM/GPRS user.

Recently, a hybrid terminal (smart phone) has been developed, in which a GSM/GPRS mobile terminal is combined with a Personal Digital Assistant (PDA) for a personal information management function. The hybrid terminal is shown in FIG. 1.

Figure 1:
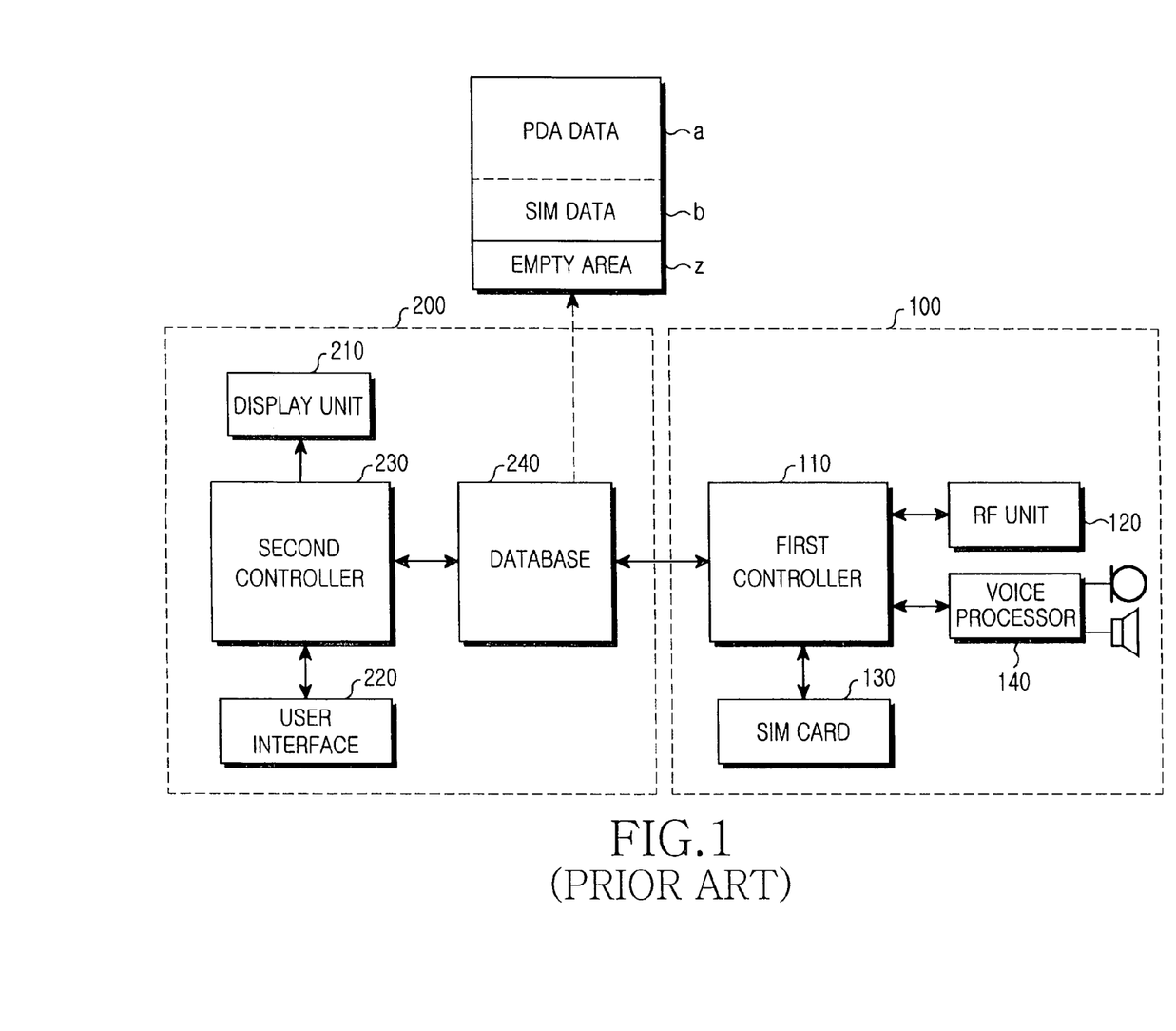
FIG. 1 is a block diagram, illustrating the construction of an existing hybrid terminal.
Figure 2A:
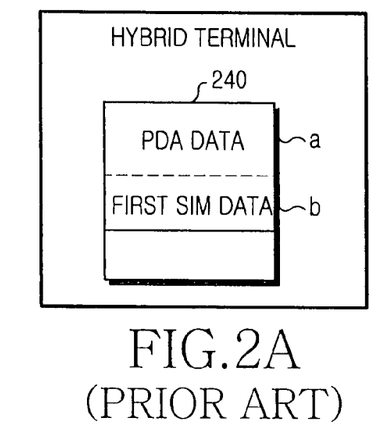
FIG. 2 is a diagram illustrating a conventional data backup and restoration process in a hybrid terminal.
Figure 2B:
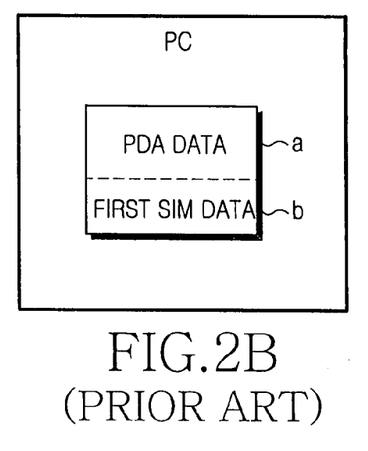
Figure 2C:
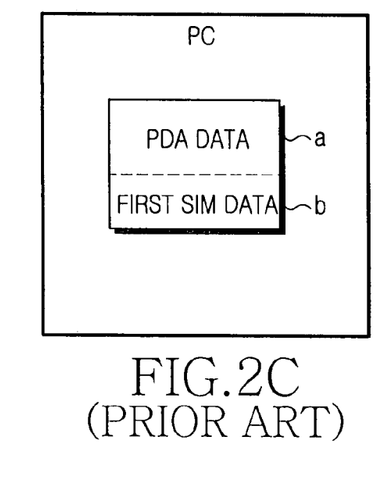
Figure 2D:
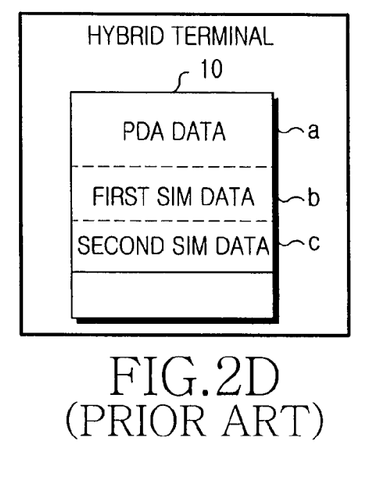

FIG. 1 is a block diagram illustrating the construction of an existing hybrid terminal. The hybrid terminal includes a PDA unit 200 and a phone unit 100. The phone unit 100 includes a first controller 110, a Radio Frequency (RF) unit 120, a SIM card 130 and a voice processor 140. The first controller 110 controls the general operation and communication function of the phone unit 100. The SIM card 130 stores an International Mobile Subscriber Identity (IMSI), Short Messaging Service (SMS) information, a phone book, etc. Further, the PDA unit 200 includes a display unit 210, a user interface 220, a second controller 230 and a database 240. The second controller 230 controls the general operation of the PDA unit 200. The database 240 is connected between the first controller 110 and the second controller 230 and stores data of the PDA unit 200 and data of the phone unit 100. Further, the database 240 is used by both the first controller 110 and the second controller 230.

In the aforementioned hybrid terminal, separate power is supplied to the PDA unit 200 and the phone unit 100. That is, the PDA unit 200 and the phone unit 100 may be separately turned on/off. However, since the hybrid terminal generally operates based on the PDA unit 200, when the PDA unit 200 is in an off state, the phone unit 100 is also in off state. In contrast, when the PDA unit 200 is in an on state, the phone unit 100 may be turned on or turned off.

In particular, in the hybrid terminal including the GSM/GPRS mobile terminal, the mobile terminal cannot use a communication function without the SIM card 130. When a user uses only the PDA unit 200 in a state in which the phone unit 100 is turned off, it is possible to use phone book data stored in the PDA unit 200. When the phone unit 100 is in on state, the database 240 is used by both the phone unit 100 and the PDA unit 200. Accordingly, the database 240 stores PDA data a and SIM data b as shown in an upper part of FIG. 1. The SIM data b stored in the database 240 is loaded from the SIM card 130 when the phone unit 100 is turned on, and the phone unit 100 manages the SIM data by means of the database 240.

In the meanwhile, since the PDA unit 200 constructs the database 240 in a volatile memory, the database 240 is deleted when the hybrid terminal is discharged. Accordingly, a user may back up the database 240 of the PDA unit 200 to a Personal Computer (PC), etc., and then restore the database 240 to the PDA unit 200 again.

Herein, since the database 240 is used by both the PDA unit 200 and the phone unit 100, the SIM data stored in the database 240 is also backed up together with the PDA data. This will be described with reference to FIG. 2.

FIG. 2 is a diagram illustrating the conventional data backup and restoration process in the hybrid terminal. When a user selects a backup function in the hybrid terminal, the hybrid terminal backs up the database 240 of the PDA unit 200 shown in FIG. 2A to the PC as shown in FIG. 2B. Accordingly, PDA data a and first SIM data b stored in the database 240 are stored in the PC. Further, PDA data a and first SIM data b of the PC shown in FIG. 2C is restored to a database 10 of the hybrid terminal as shown in FIG. 2D. If the phone unit 100 of the hybrid terminal is turned on, data of the SIM card 130 currently used in the phone unit 100 are loaded to the database 10. Accordingly, the first SIM data b restored from the PC and the second SIM data c currently loaded from the SIM card 130 co-exists in the database 10.

In the prior art as described above, since the hybrid terminal cannot separately manage the PDA data and the SIM data, the SIM data may be undesirably backed up or restored when a backup or a restoration is performed during PC synchronization. Further, as described above, when a user only the PDA unit 200 in a state where the PDA unit 200 is turned off, the database 240 may store not only the PDA data of the PDA unit 200 but also the SIM data of the phone unit 100. Therefore, the user cannot exclusively use the database 240 as a database of the PDA unit 200. Further, when the PDA unit 200 provides the PDA data to another hybrid terminal, the SIM data may also be transferred to another hybrid terminal. Therefore, there may be a problem in protection of the SIM data.

SUMMARY OF THE INVENTION

Accordingly, the present invention has been made to solve the above-mentioned problems occurring in the prior art, and an object of the present invention is to provide a method capable of ensuring the reliability of a database when a data backup or a data restoration is performed by separately managing PDA data of a PDA unit and SIM data of a phone unit in a hybrid terminal.

In accordance with one aspect of the present invention, there is provided a hybrid terminal including a mobile terminal unit for a Global System for Mobile communication (GSM) or a General Packet Radio Service (GPRS), a PDA (Personal Digital Assistant) unit combined with the mobile terminal unit, and a mirror database being connected between the mobile terminal and the PDA, for providing a memory space required for operations of the mobile terminal and the PDA, wherein the PDA includes a database for storing PDA data, reads the PDA data, and stores the read PDA data in the mirror database, wherein the mobile terminal includes a Subscriber Identity Module (SIM) card for storing SIM data, reads the SIM data, and stores the read SIM data in the mirror database.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present invention will be described with reference to the accompanying drawings. In the following description of the present invention, a detailed description of known functions and configuration incorporated herein will be omitted when it may make the subject matter of the present invention unclear.

Figure 3:
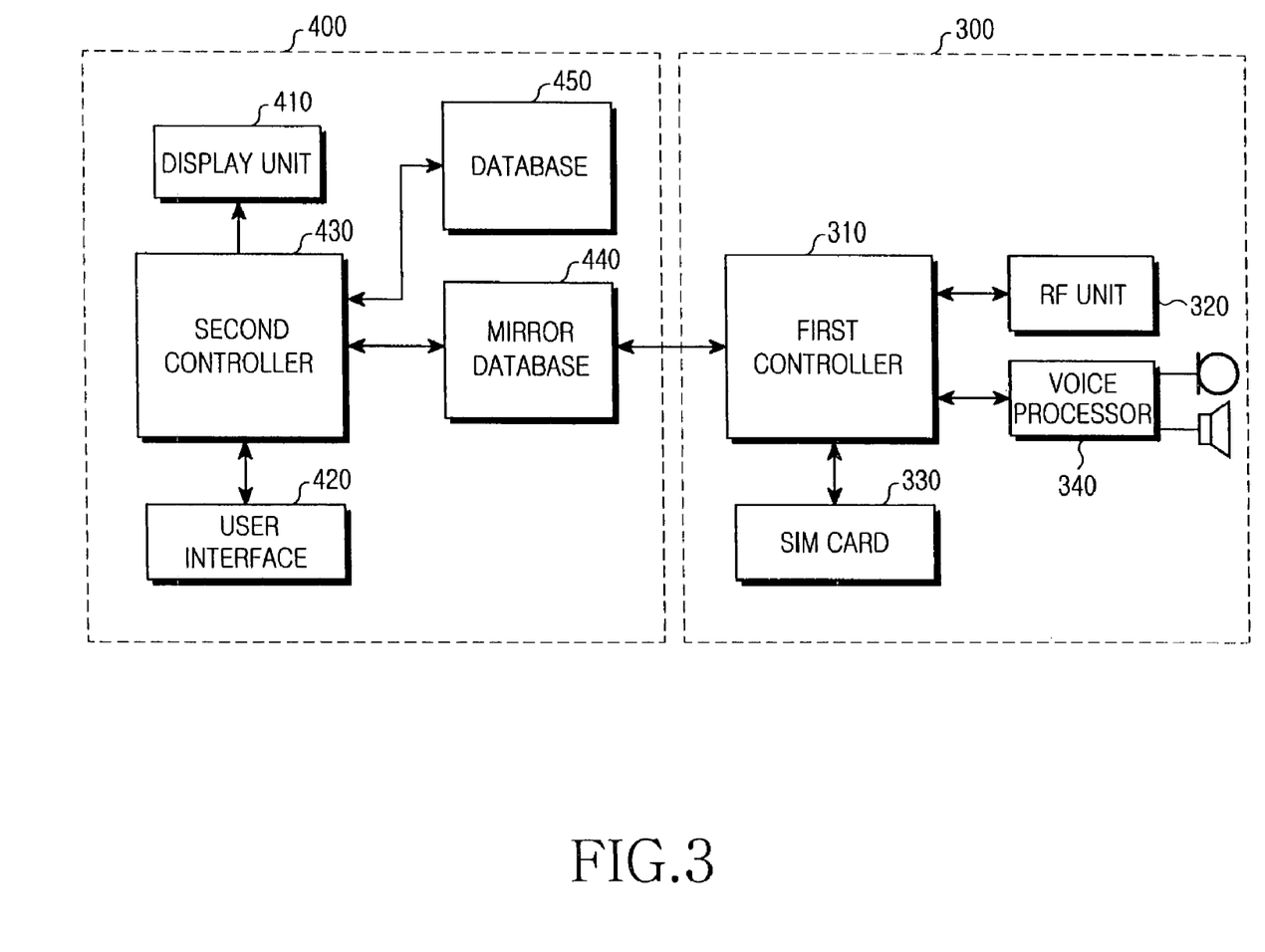
FIG. 3 is a block diagram illustrating the construction of a hybrid terminal according to an embodiment of the present invention.

FIG. 3 is a block diagram illustrating the construction of a hybrid terminal according to an embodiment of the present invention. The hybrid terminal includes a PDA unit 400 and a phone unit 300. The phone unit 300 includes a first controller 310, an RF unit 320, a SIM card 330 and a voice processor 340. The first controller 310 controls the general operation and communication function of the phone unit 300. The RF unit 320 performs a baseband conversion operation, an amplification operation and an up-converting operation for digital signals and transmits the processed signals through an antenna (not shown). Further, the RF unit 320 converts signals received through the antenna into digital signals through a down-converting operation and an amplification operation, and outputting the digital signals. The SIM card 330 stores an IMSI, SMS information, a phone book, etc. The voice processor 340 demodulates signals received via the antenna and voice-outputs the demodulated signals through a speaker. Further, the voice processor 340 converts voice signals inputted through a microphone into digital signals and outputs the digital signals.

The PDA unit 400 includes a display unit 410, a user interface 420, a second controller 430, a database 450 and a mirror database 440. The second controller 430 controls the general operation of the PDA unit 400. When the PDA unit 400 is powered on, the second controller 430 generates the mirror database 440. Then, the second controller 430 reads PDA data stored in the database 450 and stores the read PDA data in the mirror database 440. When a new PDA record to be stored in the database 450 is generated, the second controller 430 stores the new PDA record in the mirror database 440 and the database 450. In the present invention, the PDA record represents all types of data stored in the database 450 of the PDA unit 400. Further, when a PDA record to be deleted from the database 450 is generated, the second controller 430 deletes a corresponding PDA record stored in the mirror database 440 and the database 450. In the meantime, when the PDA unit 400 is powered off, the second controller 430 deletes the mirror database 440.

Further, when the phone unit 300 is powered on, the first controller 310 reads the SIM data, such as a phone book, SMS information, etc., which is stored in the SIM card 330, and stores the read SIM data in the mirror database 440. When a new SIM record to be stored in the SIM card 330 is generated, the first controller 310 stores the new SIM record in the mirror database 440 and the SIM card 330. In the present invention, the SIM record represents all types of data stored in the SIM card 330 of the phone unit 300. Further, when a SIM record to be deleted from the SIM card 330 is generated, the first controller 310 deletes a corresponding SIM record stored in the mirror database 440 and the SIM card 330. Hereinafter, the mirror database 440 will be described with reference to FIG. 4.

Figure 4:
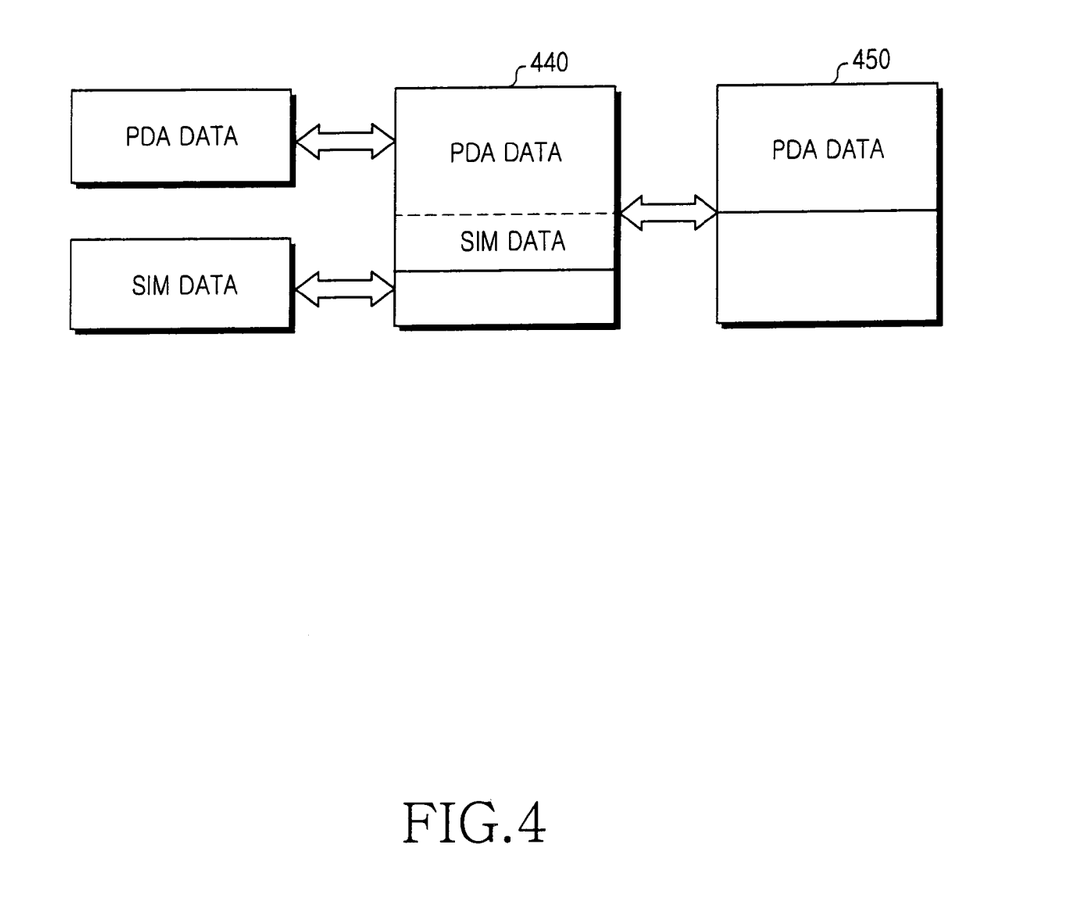
FIG. 4 is a chart illustrating a mirror database according to an embodiment of the present invention.

FIG. 4 is a diagram illustrating the mirror database 440 according to an embodiment of the present invention. The mirror database 440 is constructed to be coupled to both the first controller 310 of the phone unit 300 and the second controller 430 of the PDA unit 400. Further, the mirror database 440 provides a memory space required for operations of the PDA unit 400 and the phone unit 300.

When the PDA unit 400 is powered on, the mirror database 440 is constructed in a volatile memory by the second controller 430. The second controller 430 stores PDA data read from the database 450 in the mirror database 440. Further, when the phone unit 300 is powered on, the first controller 310 reads SIM data from the SIM card 330 and stores the read SIM data in the mirror database 440. Herein, the PDA data stored in the mirror database 440 includes a PDA database file and a PDA execution file. The SIM data stored in the mirror database 440 includes a phone database file and a phone execution file. Accordingly, when the phone unit 300 operates, the mirror database 440 provides the data and execution file required for the first controller 310. In addition, when the PDA unit 400 operates, the mirror database 440 provides the data and execution file required for the second controller 430. The data of the mirror database 440 as described above include a copy protection attribute and a hidden attribute. Therefore, the data of the mirror database 440 is backed up and/or is concealed from a user.

For example, when the PDA data is backed up to a PC, the PDA unit 400 backs up the PDA data of the database 450 to the PC, etc. Further, when the PDA data from the PC is restored, the PDA unit 400 restores the PDA data to the database 450. Accordingly, the PDA data and the SIM data are separately managed.

The user interface 420 includes a plurality of number keys and function keys and outputs input data corresponding to keys selected by a user to the first controller 310 or the second controller 430. In detail, when the hybrid terminal is in a phone mode, the user interface 420 outputs the input data to the first controller 310 of the phone unit 300. In contrast, when the hybrid terminal is in a PDA mode, the user interface 420 outputs the input data to the second controller 430 of the PDA unit 400. The user interface 420 as described above may be a general key matrix or touch screen. When the user interface 420 employs a touch screen type interface, the number keys, the function keys and direction keys displayed on the touch screen may be selected or entered by an input means such as a stylus pen.

Further, the display unit 410 displays various messages, etc., under the control of the first controller 310 and the second controller 430 and may be constructed using a Liquid Crystal Display (LCD), a Thin Film Transistor (TFT), organic Electroluminescence Display (EL), etc. Hereinafter, an operation of the PDA unit 400 according to an embodiment of the present invention will be described with reference to FIG. 5.

Figure 5:
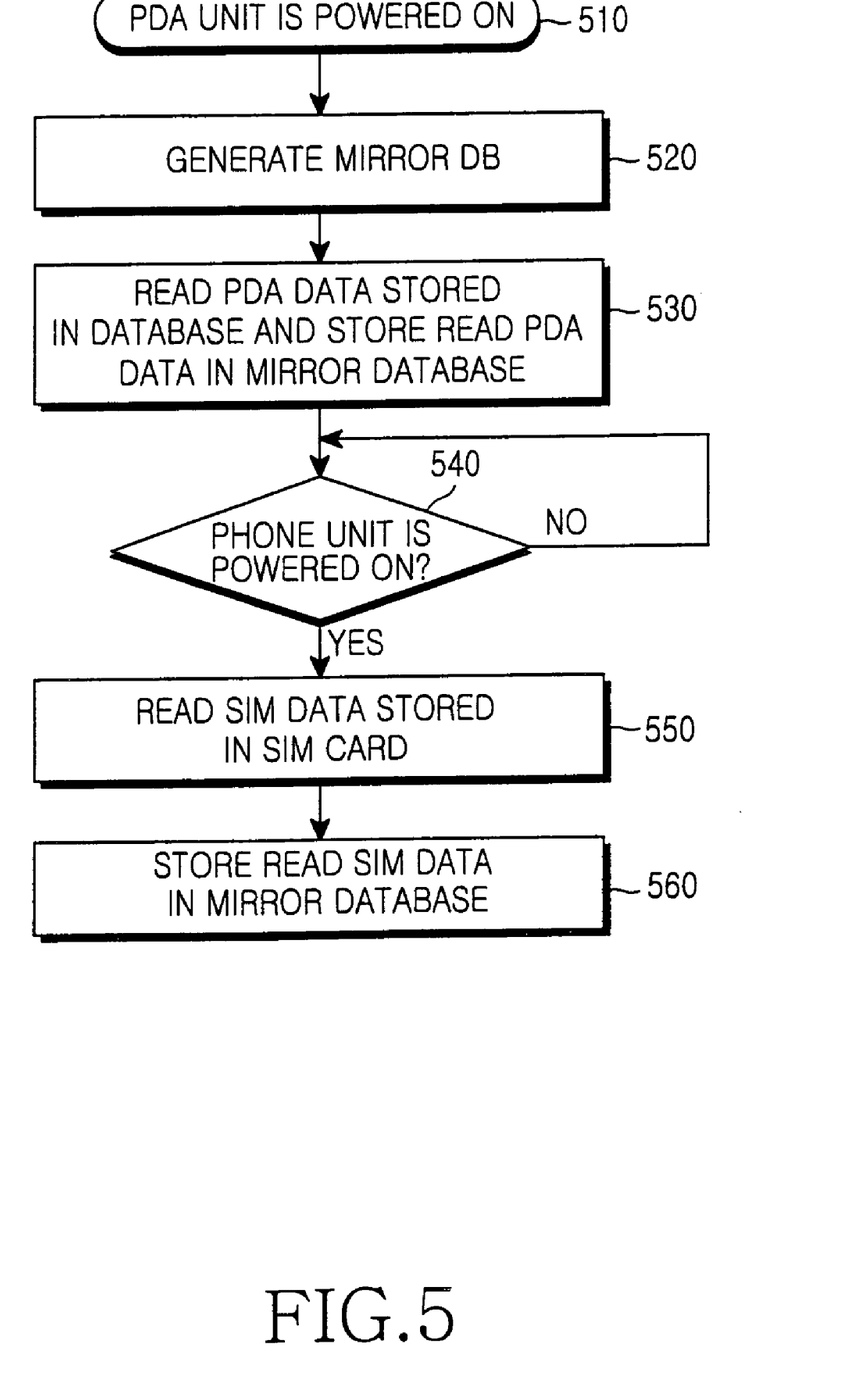
FIG. 5 is a flowchart illustrating an operation of a hybrid terminal according to an embodiment of the present invention.

FIG. 5 is a flowchart illustrating an operation of the hybrid terminal according to an embodiment of the present invention. After the PDA unit 400 is powered on in step 510, step 520 is performed to allow the second controller 430 of the PDA unit 400 to generate the mirror database 440. That is, when the PDA unit 400 is powered on, the mirror database 440 is generated. In contrast, when the PDA unit 400 is powered off, the mirror database 440 is deleted. In step 530, the second controller 430 reads PDA data stored in the database 450 and stores the read PDA data in the mirror database 440. If the phone unit 300 is powered on in step 540, the first controller 310 of the phone unit 300 reads SIM data from the SIM card 330 in step 550. Then, the first controller 310 stores the read SIM data in the mirror database 440 in step 560.

Hereinafter, a case in which a record is stored in or is deleted from the mirror database 440 will be described with reference to FIGS. 6 and 7.

Figure 6:
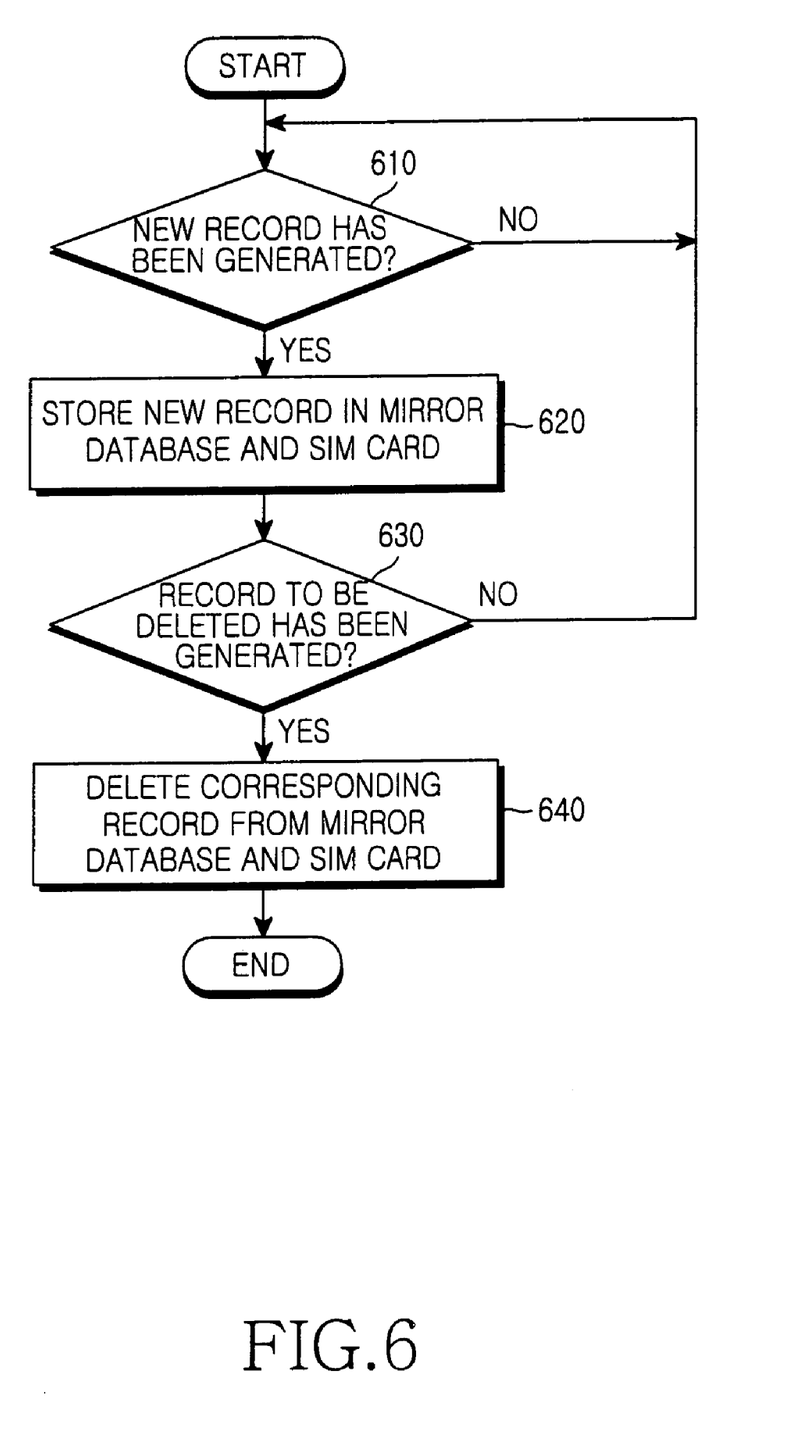
FIG. 6 is a flowchart illustrating a control operation of a phone unit for a mirror database according to an embodiment of the present invention.

FIG. 6 is a flowchart illustrating a control operation of the phone unit 300 for the mirror database 440 according to an embodiment of the present invention. The first controller 310 of the phone unit 300 determines whether a new record has been generated in step 610. The first controller 310 stores or deletes data generated according to an operation of the phone unit 300 in the SIM card 330. As described above, this data is called a SIM record and represents all types of data stored in the SIM card 330 of the phone unit 300 in the present invention. As a result of the determination in step 610, if a new record has been generated, step 620 is performed to allow the first controller 310 to store the new SIM record in the mirror database 440 and in the SIM card 330. Then, the first controller 310 determines whether a SIM record to be deleted has been generated in step 630. When the SIM record to be deleted has been generated, the first controller 310 deletes a corresponding SIM record stored in the mirror database 440 and the SIM card 330 in step 640.

Figure 7:
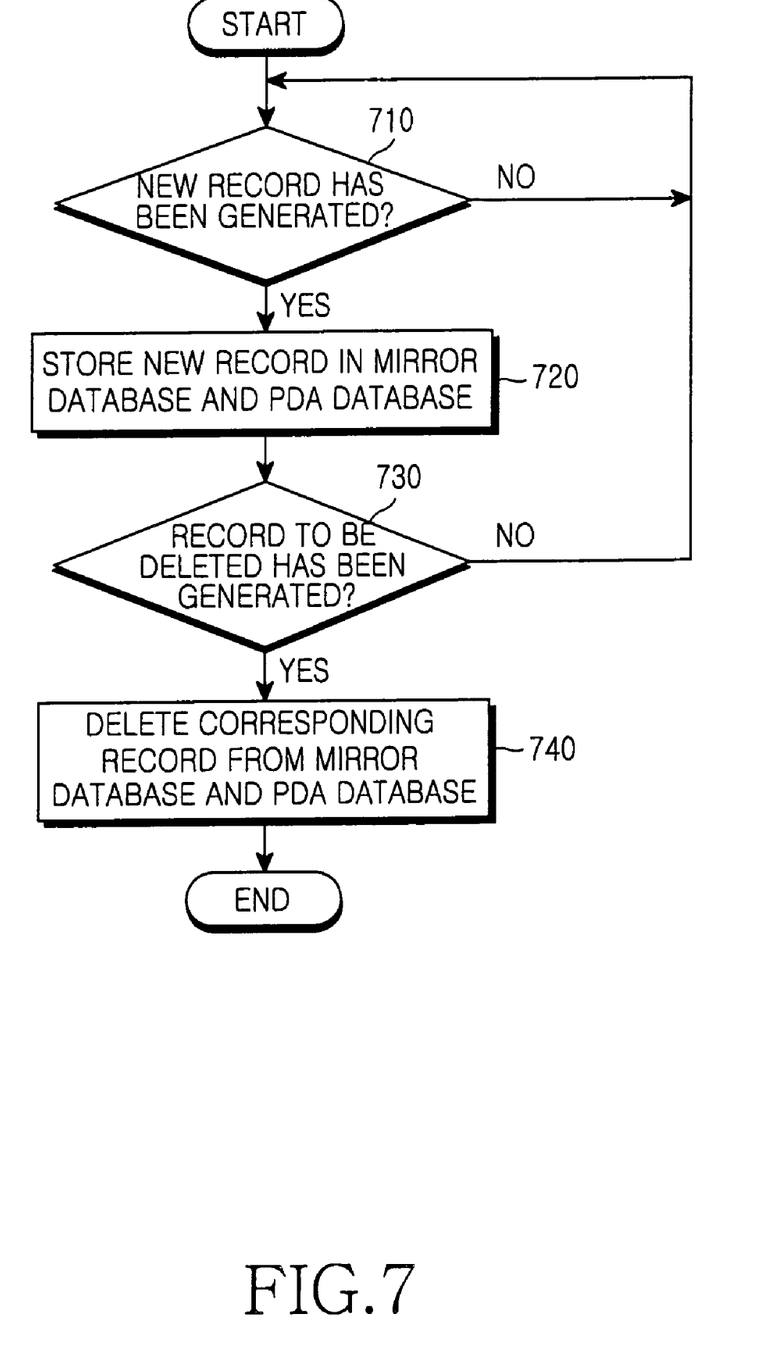
FIG. 7 is a flowchart illustrating a control operation of a PDA unit for a mirror database according to an embodiment of the present invention.
Figure 8A:
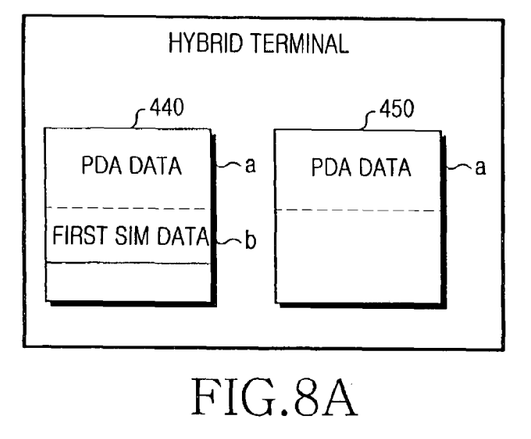
FIG. 8 is a diagram illustrating a data backup and restoring process in a hybrid terminal according to an embodiment of the present invention.
Figure 8B:
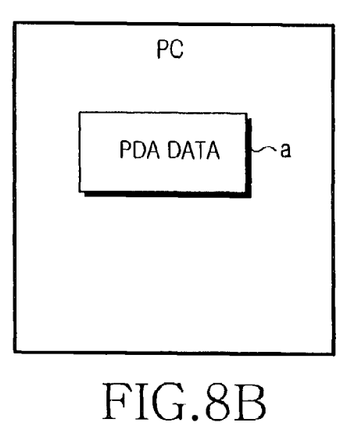
Figure 8C:
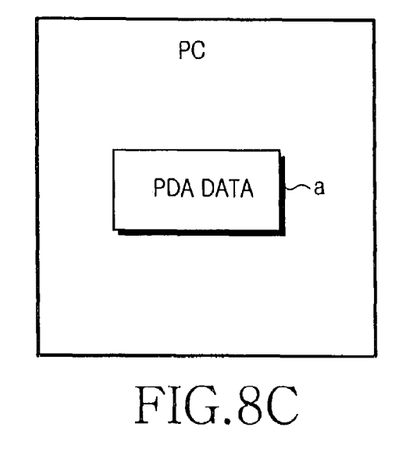
Figure 8D:
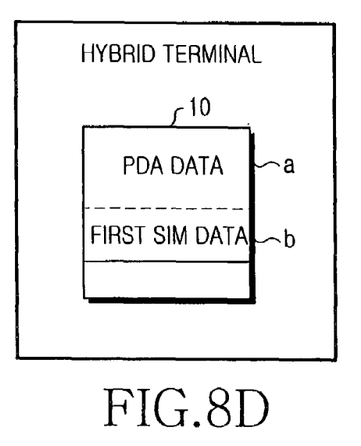

FIG. 7 is a flow diagram illustrating a control operation of the PDA unit 400 for the mirror database 440 according to an embodiment of the present invention. The second controller 430 of the PDA unit 400 determines whether a new record has been generated in step 710. The second controller 430 stores or deletes data generated according to an operation of the PDA unit 400 in the database 450. As described above, this data is called a PDA record and represents all types of data stored in the database 450 of the PDA unit 400 in the present invention. As a result of the determination in step 710, when the new record has been generated, step 720 is performed to allow the second controller 430 to store the new PDA record in the mirror database 440 and the database 450. Then, the second controller 430 determines whether a PDA record to be deleted has been generated in step 730. When the PDA record to be deleted has been generated, the second controller 430 deletes a corresponding PDA record stored in the mirror database 440 and the database 450 in step 740.

According to the present invention as described above, in the hybrid terminal having the combination of the PDA and the phone, the PDA data and the phone data are managed separately. Accordingly, it is possible to ensure the reliability of a database when the PDA data are backed up or restored. Hereinafter, a backup and restoration process will be described with reference to FIG. 8.

FIG. 8 is a flow chart illustrating a data backup and restoration process in the hybrid terminal according to an embodiment of the present invention. When a user selects a backup function in the hybrid terminal, in the hybrid terminal backs up the database 450 of the PDA unit 400 shown in FIG. 8A to the PC as shown in FIG. 8B. In the prior art, since a PDA unit and a phone unit shares a database, the database stores not only PDA data but also SIM data. However, according to the present invention, the mirror database 440 provides a memory space required for operations of the PDA unit 400 and the phone unit 300 and the database 450 is exclusively used by the PDA unit 400, so that SIM data are not backed up in the backup process. Accordingly, only the PDA data a stored in the database 450 is stored in the PC. Further, the PDA data a of the PC shown in FIG. 8C are restored to the database 10 of the hybrid terminal as shown in FIG. 8D. If the phone unit 300 of the hybrid terminal is turned on, data of the SIM card 330 currently used in the phone unit 300 are loaded to the database 10. Accordingly, the database 10 stores the PDA data a restored from the PC and the second SIM data c currently loaded from the SIM card 330. A hybrid terminal capable of restoring PDA data stored in a PC is constructed according to the present invention, the hybrid terminal includes a mirror database and a database. Accordingly, the reference number 10 represents the mirror database.

According to the present invention as described above, PDA data of a PDA unit and SIM data of a phone unit are separately managed in a hybrid terminal, so that it is possible to ensure the reliability of a database when a data backup or a data restoration is performed.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A hybrid terminal comprising:
    a mobile terminal unit for a Global System for Mobile communication (GSM) or a General Packet Radio Service (GPRS);
    a PDA (Personal Digital Assistant) unit combined with the mobile terminal unit; and
    a mirror database being connected between the mobile terminal unit and the PDA unit, for providing a memory space required for operations of the mobile terminal unit and the PDA unit,
    wherein the PDA unit includes a database for storing PDA data, reads the PDA data, and stores the read PDA data in the mirror database,
    wherein the mobile terminal unit includes a Subscriber Identity Module (SIM) card for storing SIM data, reads the SIM data, and stores the read SIM data in the mirror database,
    wherein the mirror database manages the PDA data and the SIM data separately, and
    wherein the hybrid terminal is a single mobile terminal in which the mobile terminal unit, the PDA unit, the mirror database and the database are integrated.

2. The hybrid terminal in claim 1, wherein, when a new PDA record to be stored in the database for storing PDA data is generated, the PDA unit stores the new PDA record in the mirror database and the database for storing PDA data.

3. The hybrid terminal in claim 1, wherein, when a PDA record to be deleted from the database is generated, the PDA unit deletes a corresponding PDA record stored in the mirror database and the database for storing PDA data.

4. The hybrid terminal in claim 1, wherein, when a new SIM record to be stored in the SIM card is generated, the mobile terminal unit stores the new SIM record in the mirror database and in the SIM card.

5. The hybrid terminal in claim 1, wherein, when a SIM record to be deleted from the SIM card is generated, the mobile terminal unit deletes a corresponding SIM record stored in the mirror database and in the SIM card.

6. The hybrid terminal in claim 1, wherein the data stored in the mirror database includes a copy protection attribute and a hidden attribute.

7. A method for managing a database in a hybrid terminal in which a mobile terminal unit for Global System for Mobile communication (GSM) or a General Packet Radio Service (GPRS) is combined with a PDA (Personal Digital Assistant) unit, the mobile terminal unit including a Subscriber Identity Module (SIM) card for storing SIM data, the PDA unit including a database for storing PDA data, the method comprising the steps of:

generating a mirror database for providing a memory space required for operations of the mobile terminal unit and the PDA unit after being connected between the mobile terminal unit and the PDA unit;

reading the PDA data and storing the read PDA data in the mirror database;

reading the SIM data and storing the read SIM data in the mirror database; and managing the PDA data and the SIM data separately, wherein generating the mirror database, reading and storing the PDA data, and reading and storing the SIM data are performed before the PDA data in the database or the SIM data in the SIM card is changed.

8. The method in claim 7, further comprising the step of, when a new PDA record to be stored in the database is generated, storing the new PDA record in the mirror database and the database for storing PDA data.

9. The hybrid terminal in claim 7, further comprising the step of deleting a corresponding PDA record stored in both the mirror database and in the database for storing PDA data, when a PDA record to be deleted from the database is generated.

10. The hybrid terminal in claim 7, further comprising the step of storing the new SIM record in both the mirror database and in the SIM card, when a new SIM record to be stored in the SIM card is generated.

11. The hybrid terminal in claim 7, further comprising the step of deleting a corresponding SIM record stored in the mirror database and in the SIM card, when a SIM record to be deleted from the SIM card is generated.

12. The hybrid terminal in claim 7, wherein the data stored in the mirror database includes a copy protection auribute and a hidden attribute.

* * * * *